United States Patent
Xu et al.

(10) Patent No.: US 7,235,507 B2
(45) Date of Patent: Jun. 26, 2007

(54) CATALYST FOR PURIFYING DIESEL ENGINE EXHAUST EMISSIONS

(75) Inventors: Li Xu, Flourtown, PA (US); Yinyan Huang, Framingham, MA (US); Gregory Cullen, Amesbury, MA (US); Zhongyuan Dang, Canton, MA (US); Amiram Bar-Ilan, Brookline, MA (US)

(73) Assignee: Sud-Chemie Inc., Louisville, KY (US)

( * ) Notice: Subject to any disclaimer, the term of this patent is extended or adjusted under 35 U.S.C. 154(b) by 557 days.

(21) Appl. No.: 10/918,271

(22) Filed: Aug. 14, 2004

(65) Prior Publication Data

US 2006/0035780 A1    Feb. 16, 2006

(51) Int. Cl.
- *B01J 29/06* (2006.01)
- *B01J 20/064* (2006.01)
- *B01J 29/18* (2006.01)
- *B01J 21/65* (2006.01)

(52) U.S. Cl. .......................... 502/63; 502/64; 502/66; 502/67; 502/68; 502/71; 502/74; 502/77; 502/78; 502/79; 502/80; 502/84; 502/527.19; 502/527.24

(58) Field of Classification Search ............. 502/63, 502/64, 66, 67, 68, 71, 74, 77, 78, 79, 80, 502/84, 527.19, 527.24
See application file for complete search history.

(56) References Cited

U.S. PATENT DOCUMENTS

| | | | |
|---|---|---|---|
| 4,749,671 A | 6/1988 | Saito et al. | |
| 5,039,644 A | 8/1991 | Lachman et al. | |
| 5,071,816 A | 12/1991 | Horiuchi et al. | |
| 5,157,007 A | 10/1992 | Domesle et al. | |
| 5,202,299 A | 4/1993 | Symons et al. | |
| 5,208,203 A | 5/1993 | Horiuchi et al. | |
| 5,330,945 A | 7/1994 | Beckmeyer et al. | |
| 5,371,056 A | 12/1994 | Leyrer et al. | |
| 5,514,354 A | 5/1996 | Domesle et al. | |
| 5,627,124 A | 5/1997 | Farrauto et al. | |
| 5,628,975 A | 5/1997 | Horiuchi et al. | |
| 5,648,585 A | 7/1997 | Murray et al. | |
| 5,686,377 A | 11/1997 | Banno et al. | |
| 5,849,255 A | 12/1998 | Sawyer et al. | |
| 5,871,650 A | 2/1999 | Lai et al. | |
| 5,911,961 A | 6/1999 | Horiuchi et al. | |
| 6,207,120 B1 | 3/2001 | Belmonte et al. | |
| 6,218,328 B1 | 4/2001 | Wu et al. | |
| 6,274,107 B1 | 8/2001 | Yavuz et al. | |
| 6,281,164 B1 | 8/2001 | Demmel et al. | |
| 6,433,241 B2 | 8/2002 | Wu et al. | |
| 6,689,819 B2 | 2/2004 | Bellussi et al. | |
| 6,713,032 B2 | 3/2004 | Mizobuchi et al. | |

FOREIGN PATENT DOCUMENTS

| | | |
|---|---|---|
| EP | 0694332 A2 | 7/1995 |
| EP | 0734756 A2 | 3/1996 |

*Primary Examiner*—Elizabeth D. Wood
(74) *Attorney, Agent, or Firm*—Joan L. Simunic

(57) ABSTRACT

A diesel oxidation catalyst comprising a honeycomb substrate washcoated with a mixture of clay, a refractory oxide and a zeolite is disclosed. The washcoated substrate is subsequently deposited with a precious metal catalyst and a sulfur oxidation suppressant. In a preferred embodiment, the clay is acid-leached bentonite, the refractory oxide is zirconia or titania, the zeolite is beta-zeolite or Y-zeolite or ZSM-5 or mordenite, the precious metal catalyst is preferably platinum, and the sulfur oxidation suppressant is vanadium or vanadium oxide or a combination thereof

21 Claims, No Drawings

CATALYST FOR PURIFYING DIESEL ENGINE EXHAUST EMISSIONS

BACKGROUND

The present invention discloses a diesel oxidation catalyst comprising a honeycomb substrate washcoated with a mixture of clay, a refractory oxide and a zeolite, upon which is further deposited a precious metal catalyst and a sulfur oxidation suppressant. In a preferred embodiment, the clay is bentonite, the refractory oxide is zirconia or titania, the zeolite is beta-zeolite or Y-zeolite or ZSM-5 or mordenite, the precious metal catalyst is preferably platinum, and the sulfur oxidation suppressant is vanadium or vanadium oxide or a combination thereof Internal combustion engines function by burning fuels (hydrocarbons) at high temperatures. In theory, the products of the combustion process are $CO_2$ and water. But, it is not uncommon that the combustion process is incomplete resulting in the formation of undesirable byproducts are formed such as carbon monoxide, hydrocarbons and soot. Other reactions occurring in internal combustion engines include the oxidation of nitrogen molecules to produce nitrogen oxides and the oxidation of sulfur to form $SO_2$ and small percentage of $SO_3$. Further, when the temperature decreases, the $SO_3$ can react with $H_2O$ to form sulfuric acid. Other inorganic materials are formed as ash. The products of these reactions result in undesirable gaseous, liquid and solid emissions from internal combustion engine: gaseous emissions—carbon monoxide, hydrocarbons, nitrogen oxides, sulfur dioxide; liquid phase emissions—unburned fuel, lubricants, sulfuric acid; and, solid phase emissions—carbon (soot). The combination of liquid phase hydrocarbons, solid phase soot and sulfuric acid results in the formation of small size droplets often called total particulate matter. These emissions create pollution and are potential health risks.

Efforts have been made to develop exhaust gas cleaning catalysts for a number of years. U.S. Pat. No. 4,749,671 (issued to Saito et al., on Jun. 7, 1988) teaches an exhaust gas catalyst composition composed of a refractory three-dimensional structure with a catalytically active substance thereof The catalyst is designed to burn fine carbonaceous particles in an exhaust gas from an automobile engine, particularly a diesel engine, at lower temperatures. The refractory three-dimensional structure taught is a ceramic foam, an open-flow ceramic honeycomb, a wall-flow honeycomb monolithic body, a metal honeycomb or a metal foam. To obtain the desired exhaust gas cleaning, the refractory three-dimensional structure includes numerous irregularly arranged protrusions composed of refractory inorganic powder having a particle diameter of 5 to 300 micrometers or a mixture of it with refractory inorganic fibers and the catalytically active substance supported on the protrusions. The refractory inorganic powder taught is a powder of at least one material selected from the group consisting of active alumina, silica, titania, zirconia, silica-alumina, alumina-zirconia, alumina-titania, silica-titania, silica-zirconia, titania-zirconia and zeolite. In a claimed embodiment, the catalytically active substance is at least one of the group of platinum, palladium, and rhodium, and at least one element from the group of vanadium, iron, cobalt, nickel, molybdenum, tungsten, niobium, phosphorus, lead, zinc, tin, copper, chromium, manganese, cerium, lanthanum, silver, barium, magnesium, calcium, strontium, potassium, sodium, cesium and rubidium.

U.S. Pat. No. 5,628,975 (issued to Horiuchi et al., on May 13, 1997) teaches a method for purifying exhaust gases from a diesel engine by passing the exhaust gases through a honeycomb catalyst of specified geometry. The honeycomb catalyst comprises a flow-through metal or ceramic honeycomb carrier having 250 through cells per square inch parallel to the direction of flow of the exhaust gases and at least one catalytically active component deposited thereon selected from the group consisting of platinum, palladium, rhodium, iridium, vanadium, molybdenum, copper, silver, gold, rare earth elements and partially substituted perovskite composite oxides having an oxygen vacancy, and optionally, at least one refractory inorganic oxide selected from the group consisting of alumina, silica, titania, zirconia, and zeolite.

However, neither the '671 patent nor the '975 patent teach or suggest that an acid-leached bentonite can be used in the catalyst. Acid-leaching of the bentonite results in a clay that has greater than about a 90 wt % silica content, allowing for greater dispersion of the precious metals within the catalyst and, hence, better performance of the catalyst as compared to catalysts of the prior art.

SUMMARY OF THE INVENTION

The present invention discloses a diesel oxidation catalyst comprising a honeycomb substrate washcoated with a mixture of clay, a refractory oxide and a zeolite. The washcoated substrate is subsequently deposited with a precious metal catalyst and a sulfur oxidation suppressant. In a preferred embodiment, the clay is acid-leached bentonite, the refractory oxide is zirconia or titania, the zeolite is beta-zeolite or Y-zeolite or ZSM-5 or mordenite, the precious metal catalyst is preferably platinum, and the sulfur oxidation suppressant is vanadium or vanadium oxide or a combination thereof.

The diesel oxidation catalyst preparation process comprises combining the clay, the refractory oxide and the zeolite, and then ball-milling the mixture for a predetermined time period. A ceramic core is formed, dried and then calcined. A solution of precious metal catalyst is deposited on the calcined core by incipient wetness impregnation and the precious metal coated core is dried and then calcined. Vanadium oxalate is then deposited on the platinum-treated core by incipient wetness impregnation. The vanadium coated core is dried and then calcined.

The diesel oxidation catalyst can be used to reduce diesel engine emissions by passing the exhaust gas from a diesel engine through honeycomb oxidation catalyst.

DETAILED DESCRIPTION OF PREFERRED EMBODIMENTS

The present invention discloses a diesel oxidation catalyst that can be used to reduce diesel engine emissions. The catalyst comprises a honeycomb substrate washcoated with a mixture of clay, a refractory oxide and a zeolite, which is subsequently deposited with a precious metal catalyst and a sulfur oxidation suppressant. The catalyst is prepared by the general process of combining the clay, the refractory oxide and the zeolite; ball-milling the mixture for a predetermined time period; forming a ceramic core, which is dried and then calcined; depositing the precious metal catalyst on the calcined core by incipient wetness impregnation, then drying and calcining; and depositing the sulfur oxidation suppressant on the core by incipient wetness impregnation, then drying and calcining. More than one precious metal catalyst and more than one sulfur oxidation suppressant can be deposited on the support.

The honeycomb substrate of the catalyst can be either ceramic or metallic, as is known in the art. Honeycomb supports are commonly used in applications for treatment of exhaust because the honeycombs create low back pressure to the exhaust flow. In the present application, suitable honeycomb substrates include those made of cordierite, mullite, silicon carbide, alumina, titania, zirconia, silica, alumina-silica, alumina-zirconia, stainless steel, Fe—Cr—Al alloy and the combinations and other materials typically used for diesel oxidation catalysts.

The honeycomb substrate is washcoated with a mixture of high silica-content clay, a refractory oxide and a zeolite. In the present application, the high silica-content clay is preferably bentonite, and more preferably acid-leached bentonite. The acid leaching process results in a clay that comprises over about 90% silica. In a preferred embodiment, the concentration of clay in the washcoat will be from about 50 wt % to about 100 wt %, and preferably from about 51 wt % to about 75 wt %.

Refractory oxides are used in sulfur tolerant catalyst compositions. Exemplary refractory oxides include alumina, silica, titania, zirconia, ceria doped zirconia, tungsten doped titania and combinations thereof In the present application, the refractory oxides are preferably titania and/or zirconia. In general, because basic oxides can result in undesirable side reactions, it is preferred that acidic oxides be used as the support. In a preferred embodiment, the concentration of refractory oxides in the washcoat will be from about 0 wt % to about 50 wt %, and preferably from about 10 wt % to about 30 wt %.

As is known in the art, there is a wide variety of naturally-occurring zeolite materials. Suitable zeolites for the preparation of the present diesel oxidation catalysts are beta-zeolite, Y-zeolites, ZSM-5, mordenite, and others with similar acid site density, pore sizes and having a silica-to-alumina ratio of from about 5 to about 250. The zeolites can be used either in the known H-form or in a metal-exchanged form. In a preferred embodiment, the concentration of zeolite in the washcoat will be from about 0 wt % to about 50 wt %, and preferably from about 10 wt % to about 30 wt %.

The clay, the refractory oxide and the zeolite and combined to form a mixture. The mixture is ball-milled for a predetermined time period. In a representative example, the ball-milling time is from about one hour to about six hours depending on the components of the mixture. After the mixture is ball-milled, a ceramic core can be formed. The core is dried and then calcined. For a core having a diameter of about 1.75", a length of about 2" and a cell density of about 400 cpsi, suggested conditions are drying at about 125° C. for about two hours and then calcining at about 550° C. for about three hours. The resulting calcined core will have a washcoat loading dependent on the initial concentration of materials in the mixture. In a preferred embodiment, the total washcoat loading on a dry basis is from about 1000 g/cf to about 4000 g/cf, and preferably from about 2000 g/cf to about 3000 g/cf.

The precious metal catalyst can then be deposited on the washcoated honeycomb substrate. The precious metal catalyst is selected from the group consisting of platinum, palladium, rhodium and combinations thereof, and can be deposited in the form of a salt solution such as, without limitation, platinum sulfite acid platinum, tetraamine nitrate, palladium nitrate, and rhodium nitrate. In a preferred embodiment, the precious metal loading on the catalyst is from about 1 g/cf to about 200 g/cf, and preferably from about 20 g/cf to about 60 g/cf The sulfur oxidation suppressant can then be deposited on the metal-loaded substrate. The suppressant is selected from the group consisting of vanadium, chromium, bismuth, tin and combinations thereof, and can be deposited in the form of a salt solution. For example, if vanadium is added to the substrate, it can be added as a solution of vanadium pentaoxide, ammonium vanadate, and vanadium oxalate, without limitation. In a preferred embodiment, the sulfur oxidation suppressant loading on the catalyst is from about 20 g/cf to about 200 g/cf, and preferably from about 40 g/cf to about 100 g/cf.

The precious metal catalyst and the sulfur oxidation suppressant can be deposited on the washcoated honeycomb substrate by a variety of methods known in the art, such as, for example, incipient wetness impregnation or dipping. Alternatively, the precious metal catalyst and the sulfur oxidation suppressant can be combined with the honeycomb washcoat components and then applied to the honeycomb substrate in a single treatment stage.

The following examples illustrate and explain the present invention, but are not to be taken as limiting the present invention in any regard. Example 1 is a honeycomb substrate with a platinum catalyst and a conventional washcoat. Example 2 is a honeycomb substrate with a platinum catalyst and an inventive washcoat. Examples 3, 5 and 7 are honeycomb substrates with a platinum catalyst, a vanadium suppressant and a conventional washcoat. Examples 4, 6 and 8 are honeycomb substrates with a platinum catalyst, a vanadium suppressant and an inventive washcoat.

Examples 1-8 were prepared according to the following general procedure: A catalyst washcoat slurry is prepared by combining the components indicated in Table I, then ball-milling for the specified time. A ceramic core having a diameter of about 1.75", a length of about 2" and a cell density of about 400 cpsi is formed and dried at about 125° C. for about two hours. The dried core is then calcined at about 550° C. for about three hours. The resulting calcined core has a washcoat loading as specified in Table I. Platinum sulfite acid is deposited on the calcined core by incipient wetness impregnation using a platinum sulfite acid solution, with an exemplary concentration of about 0.037 molar. The platinum coated core is dried at about 125° C. for about one hour, and is then calcined at about 550° C. for about two hours. Samples 3-7 then have vanadium oxalate deposited on the platinum-treated core by incipient wetness impregnation using a vanadium oxalate solution, with an exemplary concentration of about 0.40 molar. The vanadium coated core is dried at about 125° C. for about one hour, and is then calcined at about 550° C. for about two hours. The resulting catalyst has the metal loadings shown in Table I. The catalyst samples are tested on a lab bench reactor for the oxidation of CO, propene or BTX (benzene, toluene, xylene), and $SO_2$. The testing conditions are: 40,000/h GHSV, 1000 ppm CO, 30 ppm each for BTX, 600 ppm propene, 100 ppm $SO_2$, 3% $H_2O$.

| Component | 1 (comp) | 2 | 3 (comp) | 4 | 5 (comp) | 6 | 7 (comp) | 8 |
|---|---|---|---|---|---|---|---|---|
| acid leached bentonite | | 420 g | | 420 g | | 500 g | | 425 g |
| alumina | 300 g | | | | 300 g | | | |
| alumina colloid (AL20) | 75 g | | | | 75 g | | | |
| beta zeolite (BEA25) | | | | | | 500 g | | |
| ceria doped $ZrO_2$ | | 252 g | 612 g | 252 g | | 500 g | 75 g | |
| $CeO_2$ colloid | | 1000 ml | | 1000 ml | | 1230 ml | | 300 g |
| silica powder | | | | | | | 300 g | |
| $SiO_2$ colloid | | | | | | | 750 g | |
| $ZrO_2$ colloid | | 200 g | 200 g | 200 g | | | | |
| glacial acid | 12 ml | 30 ml | 20 ml | 30 ml | 12 ml | 60 ml | | |
| deionized water | 400 ml | 700 ml | 800 ml | 700 ml | 400 ml | 1300 ml | 300 ml | 600 ml |
| ball-milled for ___ hours: | six | two | six | two | six | two | two | one |
| washcoat loading (g/in³) | 1.6 | 1.8 | 1.6 | 1.8 | 1.6 | 1.6 | 1.7 | |
| metal loadings | Pt 40 g/cf | Pt 37 g/cf | Pt 37 g/cf | Pt 40 g/cf | Pt 40 g/cf | Pt 40 g/cf | Pt 43 g/cf | Pt 38 g/cf |
| | | V 70 g/cg | V 70 g/cf | V 76 g/cf | V 70 g/cf | V 70 g/cf | V 57 g/cf | V 56 g/cf |
| $C_3H_6$ $T_{50}$ (*BTX) (° C.) | 204 | 229 | 227* | 221 | 237 | 195 | 248 | 232 |
| CO $T_{50}$ (° C.) | 202 | 223 | 227 | 205 | 221 | 175 | 226 | — |
| $SO_2$ Conv. % 350° | 56 | 48 | 10 | 10 | 25 | 15 | 4 | 15 |
| 450° | 80 | 70 | 13 | 13 | 33 | 21 | 10 | 18 |
| 550° | — | — | 50 | 42 | 52 | 30 | 45 | 32 |

The catalysts comprising the honeycomb substrate washcoated with a mixture of clay, a refractory oxide and a zeolite, upon which is further deposited a precious metal catalyst and a sulfur oxidation suppressant demonstrate activity similar to the prior art catalysts for the oxidation CO, BTX and propene, but the activity for $SO_2$ oxidation is low. High temperature aging studies of the catalysts of the present invention confirm that the catalysts have good thermal stability and there is no significant activity loss after high temperature aging. In addition, high temperature aging leads to lower $SO_2$ oxidation activity.

What is claimed is:

1. A diesel oxidation catalyst comprising a honeycomb substrate with a washcoat and a precious metal catalyst and a sulfur oxidation suppressant, wherein:
   (a) said honeycomb substrate is cordierite, mullite, silicon carbide, alumina, titania, zirconia, silica, alumina-silica, alumina-zirconia, stainless steel, Fe—Cr—Al alloy and the combinations thereof;
   (b) said washcoat is a mixture of:
      (i) from about 50 wt % to about 100 wt % of an acid-leached bentonite;
      (ii) from about 0 wt % to about 50 wt % of a refractory oxide, selected from titania, zirconia and combinations thereof; and,
      (iii) from about 0 wt % to about 50 wt % of a zeolite, selected from the group consisting of beta-zeolite, Y-zeolites, ZSM-5, mordenite, zeolites having a silica-to-alumina ratio of from about 5 to about 250, and combinations thereof,
   (c) said precious metal catalyst is selected from the group consisting of platinum, palladium, rhodium and combinations thereof, and
   (d) said sulfur oxidation suppressant selected from the group consisting of vanadium, chromium, bismuth, tin and combinations thereof.

2. The catalyst of claim 1 wherein said washcoat loading on a dry basis is from about 1000 g/cf to about 4000 g/cf, said precious metal loading is from about 1 g/cf to about 200 g/cf, and said the sulfur oxidation suppressant loading is from about 20 g/cf to about 200 g/cf.

3. The catalyst of claim 1 wherein said acid-leached bentonite comprises over about 90% silica.

4. The catalyst of claim 1 wherein the bentonite comprises from about 51 wt % to about 75 wt % of the washcoat.

5. The catalyst of claim 1 wherein the refractory oxides comprise from about 10 wt % to about 30 wt % of the washcoat.

6. The catalyst of claim 1 wherein the zeolites comprise from about 10 wt % to about 30 wt % of the washcoat.

7. The catalyst of claim 1 wherein the precious metal loading on the catalyst is from about 20 g/cf to about 60 g/cf.

8. The catalyst of claim 1 wherein the sulfur oxidation suppressant loading on the catalyst is from about 40 g/cf to about 100 g/cf.

9. The catalyst of claim 1 wherein said precious metal catalyst is delivered as a salt selected from the group platinum sulfite acid platinum, tetraamine nitrate, palladium nitrate, and rhodium nitrate.

10. The catalyst of claim 1 wherein said suppressant is delivered as a salt selected from the group consisting of vanadium pentaoxide, ammonium vanadate, and vanadium oxalate.

11. A diesel oxidation catalyst comprising a honeycomb substrate with a washcoat loading of on a dry basis of from about 1000 g/cf to about 4000 g/cf and a precious metal catalyst loading of from about 1 g/cf to about 200 g/cf and a sulfur oxidation suppressant loading of from about 20 g/cf to about 200 g/cf, wherein:
   (a) said honeycomb substrate is cordierite, mullite, silicon carbide, alumina, titania, zirconia, silica, alumina-silica, alumina-zirconia, stainless steel, Fe—Cr—Al alloy and the combinations thereof,
   (b) said washcoat is a mixture of:
      (i) from about 50 wt % to about 100 wt % of a high-silica content clay;
      (ii) from about 0 wt % to about 50 wt % of a refractory oxide, selected from alumina, silica, titania, zirconia, ceria doped zirconia, tungsten doped titania and combinations thereof; and,
      (iii) from about 0 wt % to about 50 wt % of a zeolite, selected from the group consisting of beta-zeolite, Y-zeolites, ZSM-5, mordenite, zeolites having a silica-to-alumina ratio of from about 5 to about 250, and combinations thereof;

(c) said precious metal catalyst is selected from the group consisting of platinum, palladium, rhodium and combinations thereof; and (d) said sulfur oxidation suppressant selected from the group consisting of vanadium, chromium, bismuth, tin and combinations thereof.

12. The catalyst of claim 11 wherein the clay is acid-leached bentonite.

13. The catalyst of claim 11 wherein the bentonite comprises from about 51 wt % to about 75 wt % of the washcoat.

14. The catalyst of claim 11 wherein the refractory oxides comprise from about 10 wt % to about 30 wt % of the washcoat.

15. The catalyst of claim 11 wherein the zeolites comprise from about 10 wt % to about 30 wt % of the washcoat.

16. The catalyst of claim 11 wherein the precious metal loading on the catalyst is from about 20 g/cf to about 60 g/cf.

17. The catalyst of claim 11 wherein the sulfur oxidation suppressant loading on the catalyst is from about 40 g/cf to about 100 g/cf.

18. A diesel oxidation catalyst comprising a honeycomb substrate washcoated with a mixture of clay, a refractory oxide and a zeolite, and deposited with a precious metal catalyst and a sulfur oxidation suppressant, prepared by the method of combining said clay, said refractory oxide and said zeolite to form a mixture, and then ball-milling said mixture for a predetermined time period, and then forming a ceramic core, and then drying and calcining said core, and then depositing said precious metal catalyst on said calcined core by incipient wetness impregnation, and then drying and calcining said precious metal-treated core, and then depositing said sulfur oxidation suppressant on said precious metal-treated core by incipient wetness impregnation, and then drying and calcining said suppressant-treated core to obtain said catalyst.

19. The catalyst of claim 18 wherein said precious metal catalyst is deposited in the form of a salt solution selected from the group consisting of platinum sulfite acid platinum, tetraamine nitrate, palladium nitrate, and rhodium nitrate.

20. The catalyst of claim 18 wherein said sulfur oxidation suppressant is deposited in the form of a salt solution selected from the group consisting of vanadium pentaoxide, ammonium vanadate, and vanadium oxalate.

21. The catalyst of claim 18 wherein said precious metal catalyst and said sulfur oxidation suppressant are added to the mixture with said clay, said refractory oxide and said zeolite.

* * * * *